United States Patent [19]
Grant

[11] Patent Number: 4,896,456
[45] Date of Patent: Jan. 30, 1990

[54] PLANT SUPPORTING SYSTEM

[76] Inventor: Douglas Grant, 700 Harmony Road, Suite 37, Oshawa, Ontario, Canada, L1K 1S2

[21] Appl. No.: 268,874

[22] Filed: Nov. 8, 1988

[51] Int. Cl.$^4$ .............................................. A01G 9/02
[52] U.S. Cl. ............................................ 47/67; 47/83
[58] Field of Search ................... 47/67, 68, 41.11, 83, 47/67, 68; 211/87, 100, 88, 126; 248/311.2, 322, 215, 340, 318, 243; 223/89

[56] References Cited

U.S. PATENT DOCUMENTS

| | | | |
|---|---|---|---|
| 1,084,414 | 1/1914 | Eger | 47/68 |
| 1,955,476 | 4/1934 | Torgersen | 47/68 X |
| 2,223,074 | 11/1940 | Martin | 47/36 |
| 2,749,072 | 6/1956 | Long | 248/214 |
| 2,891,678 | 6/1959 | Levy | 211/126 |
| 2,982,423 | 5/1961 | Handler et al. | 211/136 |
| 3,097,746 | 7/1963 | Handler et al. | 211/126 |
| 3,122,238 | 2/1964 | Brunette | 211/126 |
| 3,627,247 | 12/1971 | Krikorian | 248/243 |
| 3,828,937 | 8/1974 | Nash | 211/86 |
| 4,048,754 | 9/1977 | Laux | 47/68 |
| 4,074,882 | 2/1978 | Anderson | 47/67 X |
| 4,228,906 | 10/1980 | Jones | 211/126 |
| 4,380,136 | 4/1983 | Karpisek | 47/83 |
| 4,411,400 | 10/1983 | Everett | 248/216.1 |
| 4,698,936 | 10/1987 | Helfman | 47/68 |

FOREIGN PATENT DOCUMENTS

| | | | |
|---|---|---|---|
| 3506407 | 8/1986 | Fed. Rep. of Germany | 47/67 |
| 2390897 | 12/1978 | France | 47/83 |

Primary Examiner—Robert A. Hafer
Assistant Examiner—Lynda M. Cofsky

[57] ABSTRACT

A system for growing plants against a vertical wall such as a fence, partition between apartment balconies or the like. Each support is an integrally formed member with an elongate support portion and a U-shaped hook-portion which fits freely and removably about an upper horizontal portion of the wall. The elongate support portion has a number of vertically spaced-apart openings which access a longitudinal channel formed in the surface of the elongate support portion which rests against the wall. A number of receptacles are provided to receive soil. Each receptacle has a pair of horizontally spaced-apart hooks which can be releasably secured in any one of the openings formed in the supports. The spacing between the supports is fixed solely by securing receptacle between the supports. No fasteners are required to secure the system to the wall, and the system can be readily assembled and disassembled without tools.

8 Claims, 2 Drawing Sheets

PLANT SUPPORTING SYSTEM

FIELD OF THE INVENTION

The invention relates to systems for growing of plants against fences, apartment balcony railings and other vertical walls.

DESCRIPTION OF THE PRIOR ART

In growing plants, it is often desirable to suspend plants for esthetic purposes from a vertical wall such as a partition between adjoining houses, a fence or even an apartment balcony railing. A very common practice in that regard is to suspend a flower pot with a bracket that is screwed directly into the wall. Another common practice, particularly on apartment balconies, is to suspend a flower boxes directly from a railing with a wire frame structure dimensioned to receive the entirety of the box and to hook at various points over the top of the railing.

Use of brackets and screws to support a flower pot or other soil receptacle are cumbersome, requiring tools, time and care to ensure that the soil receptacle is properly positioned. Use of wire support frames is simpler and results in no alteration to the supporting structure, but lacks versatility.

It is accordingly an object of the present invention to provide a system for growing plants against certain vertical walls which is more flexible, which does not intrinsically require screw-type fasteners or other relatively permanent means to secure to a wall, and which can be readily altered, expanded or removed.

BRIEF SUMMARY OF THE INVENTION

In one aspect, the invention provides a modular, horizontally-adjustable system for growing plants against a vertical wall which has an upper horizontal wall portion. The system includes a plurality of individually movable supports, each support having an elongate support portion and a hook portion shaped to fit freely and removably about the upper horizontal wall portion to suspend the elongate support portion in a generally vertical orientation. The elongate support portion has a multiplicity of connector portions (which can be simple openings) which are vertically spaced-apart when the elongate support portion is in view in a generally vertical orientation. The system also includes a plurality of receptacles which can be used to receive soil. Each receptacle is associated with at least one pair of horizontally spaced-apart complementary connector portions (which can be hooks), each complementary connector portion being shaped to mate with any one of the connector portions associated with the supports to releasably secure the associated receptacle to the support. The horizontal spacing between each pair of supports is set solely by securing at least one receptacle between the supports. As used in this specification, the term "horizontally-adjustable" should be understood as meaning that the horizontal expanse of wall covered by the system and provided with receptacles can be expanded or contracted by addition or elimination of a support and receptacles joining the support to the system.

One advantage associated with such a system is that no threaded fasteners or the like is required to secure the system directly to a wall and no tools are required for such purposes. The system can be readily rearranged or altered, and the introduction of additional supports and receptacles permits the system to be very conveniently expanded.

Other aspects of the invention will become apparent from a description below of a preferred embodiment and will be more specifically defined in the appended claims.

DESCRIPTION OF THE DRAWINGS

The invention will be better understood with reference to drawings illustrating a preferred embodiment, in which.

DESCRIPTION OF THE PREFERRED EMBODIMENT

Figure 1:
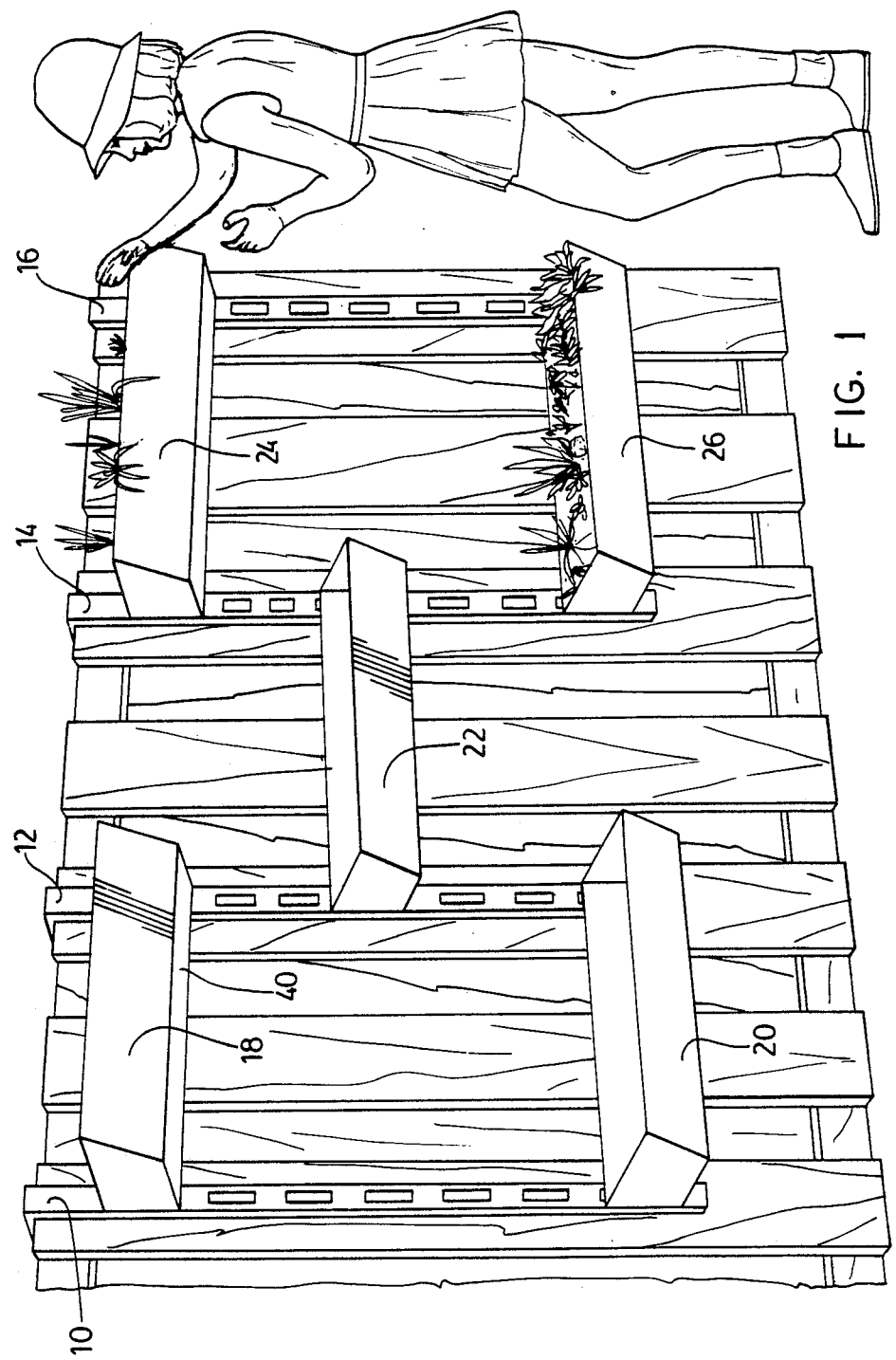
FIG. 1 is a perspective view of a system mounted against a vertical fence.

FIG. 1 illustrates a plant growing system suspended from vertical fence in a yard. The system comprises four identical supports 10-16 (even numbers only) and comprises five receptacles 18-26 (even numbers only) which are suspended from the supports. Each receptacle is capable of receiving soil in which plants can be grown, but might alternatively be configured to receive and hold a potted plant.

Figure 2:
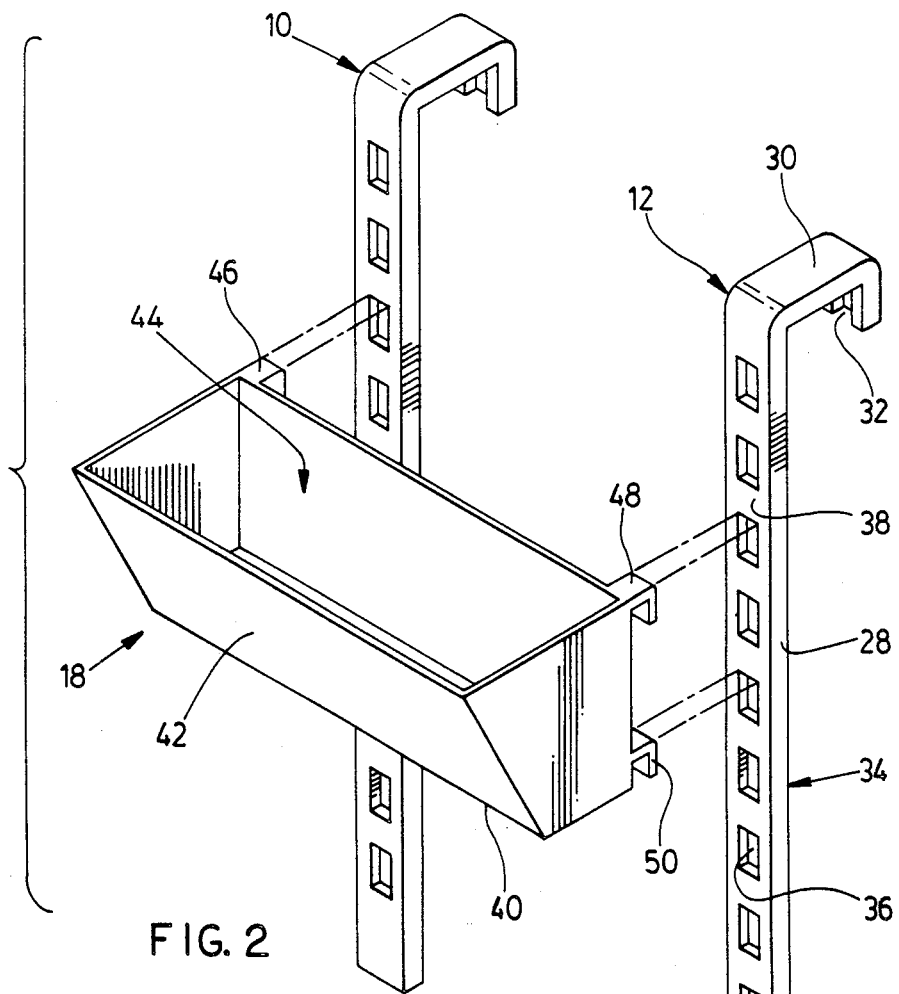
FIG. 2 is an enlarged exploded perspective view of two supports and a receptacle associated with the system of FIG. 1.

The support 12 is typical and details of its construction will be more apparent with reference to FIG. 2. The support 12 is integrally formed of a plastic material and comprises an elongate support portion 28 and a generally U-shaped hook portion 30 which locates freely and removably about an upper horizontal portion of the fence. When so hooked over the fence, the elongate support portion 28 is in the generally vertically illustrated. A longitudinal groove or channel 32 is formed in the surface 34 of the elongate support portion 28 which is expected normally to engage or immediately confront a wall. A multiplicity of openings (such as the opening 36) are formed in the opposing outwardly facing surface 38 of the elongate support portion 28, each opening accessing the longitudinal channel 32. Each of these openings together with the longitudinal channel 32 defines a connector portion for use in suspending the receptacles. These receive complementary hook connectors formed on the receptacles. The openings are vertically spaced-apart at regular intervals to permit the receptacles to be mounted at various heights, as desired.

Figure 3:
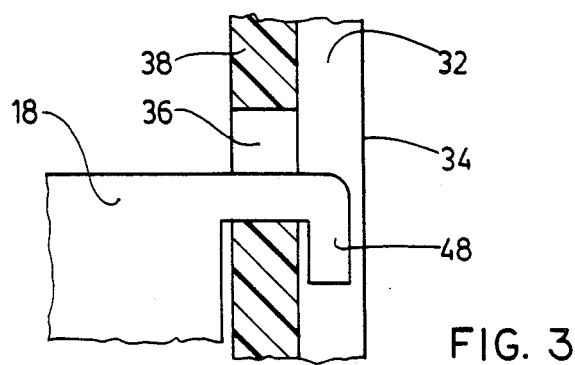
FIG. 3 shows details of how the receptacle is releasably secure to one of the supports of FIG. 2.

The receptacle 18 illustrated in FIG. 2 is also typical of the various receptacles illustrated. It has a base 40, sidewall 42 extending upwardly from the base 40, and an open top 44. In this embodiment, the receptacle 18 is integrally formed with an upper pair of horizontally spaced-apart hooks 46, 48 and a lower pair of horizontally spaced-apart hooks (only one lower hook 50 being apparent in FIG. 2) vertically aligned with the upper pair. The upper hook 48 which is typical is shown in FIG. 3 inserted through the opening 36 and into the channel 32 associated with the support portion 28 to releasably secure the receptacle 18 to the associated elongate support portion 28. All four hooks associated with the receptacle 18 can be similarly and simultaneously installed in any four appropriately positioned holes associated with the pair of supports.

The advantages associated with the invention should now be more apparent from the description of the preferred embodiment. The various supports can be secured to a vertical wall such as a fence by simply hooking over the top of the wall. There is no need to fix the supports to the walls with screws or other fastening structure, and no tools are required. There is also no need to carefully and accurately position the supports since the spacing between each pair of supports is determined solely by securing at least one receptacle between them. If the spacing is inappropriate, one can simply slide or remove and re-hook a support over the top of the fence. Accordingly, a structure such as that illustrated in FIG. 1, and markedly more complex structures, can be progressively built without concern for errors in initial positioning or either supports or receptacles. It should also be apparent that the system can be readily altered or removed. Expansion is possible at any time by simply providing additional supports and additional receptacles.

Although connections involving openings and a channel in a support and complementary hooks associated with receptacles have been shown, other complementary connector arrangement can be used. For example, one might form the elongate upright support portion of each support with a multiplicity of vertically spaced-apart, upwardly-directed hooks. Each of the receptacles might then be formed with paired, open-ended tubular or ring-shaped connectors which fit over the hooks. Other connector arrangements will be apparent. Although the supports are preferably integrally molded from an appropriate plastic, one alternative would be to use channeled lengths of metal appropriately punched or die cut to define the openings and appropriately bent to define the associated hook portions. Also, some measure of adjustability in the size of the hook portion might be provided in any appropriate manner.

It is also within the ambit of the present invention to form a receptacle for the system in a generally L-shaped or right-angled configuration to fit into corners, as between adjoining vertical walls. To provide additional support at the corner, such a receptacle can be formed with additional connectors immediately to either side of its corner and supports can be suspended on both walls where they form their corner to receive the additional receptacle connectors.

It will be appreciated that a particular embodiment of the invention has been described and that modifications may be made therein without departing from the spirit of the invention or necessarily departing from the scope of the appended claims.

The embodiments of an invention in which an exclusive property or privilege is claimed are defined as follows:

1. A modular, horizontally-adjustable plant growing system adapted for use against a vertical wall having an upper horizontal wall portion, the plant growing system comprising:

individually movable supports arranged in a plurality of horizontally adjacent pairs, each support comprising a hook portion fitted removably about the upper horizontal wall portion thereby suspending the support in a generally vertical orientation and comprising an elongate support portion having a multiplicity of vertically spaced-apart connector portions;

a plurality of receptacles, each receptacle having a bottom, a sidewall and an open top which are shaped to receive and retain soil, each receptacle having at least one pair of horizontally spaced-apart complementary connector portions, each complementary connector portion being shaped to mate with any one of the connector portions associated with the supports to releasably secure the associated receptacle at various selectable vertically spaced-apart positions relative to the supports; and, each adjacent pair of supports being connected by at least one of the receptacles such that all the supports are joined together by the receptacles, the spacing between each adjacent pair of supports being fixed solely by securing the receptacles to the supports.

2. The system of claim 1 in which each of the connector portions associated with each of the supports comprises a hole formed in the elongate support portion and in which each of the complementary connector portions associated with the receptacles comprises a hook shaped to fit into the hole and receive an adjacent portion of the elongate support portion.

3. The system of claim 1 in which the multiplicity of connector portions associated with each elongate support portion are defined by a longitudinal groove formed in one surface of the elongate support portion normally proximate to the wall when the associated hook portion is fitted over and about the upper horizontal wall portion and by a multiplicity of openings formed in an opposing surface of the elongate support portion and each accessing the longitudinal groove.

4. The system of claim 3 in which the at least one pair of complementary connector portions associated with each receptacle is a pair of hooks, each hook being shaped for insertion through any one of the multiplicity of openings associated with each elongate support portion into the associated longitudinal channel.

5. The system of 4 in which each of the receptacle is integrally formed with the associated pair of hooks.

6. The system of claim 5 in which each support members is integrally formed.

7. A modular, horizontally-adjustable plant growing system adapted for use against a vertical wall having an upper horizontal wall portion, the plant growing system comprising:

individually movable supports arranged in a plurality of horizontally adjacent pairs, each support comprising a hook portion fitted removably about the upper horizontal wall portion thereby suspending the support in a generally vertical orientation and comprising an elongate support portion having a multiplicity of vertically spaced-apart connector portions;

a plurality of receptacles, each receptacle having a bottom, a sidewall and an open top which are shaped to receive and retain soil, each receptacle having at least one pair of horizontally spaced-apart complementary connector portions, each complementary connector portion being shaped to mate with any one of the connector portions associated with the supports to releasably secure the associated receptacle at various selectable vertically spaced-apart positions relative to the supports; and, each support being connected to each horizontally adjacent support by at least one of the receptacles such that all the supports are joined together by the receptacles, the spacing between each adjacent pair of supports being fixed solely by securing the receptacles to the supports.

8. The system of 7 in which each of the receptacles is integrally formed with the associated at least one pair of complementary connector portions and in which each support members is integrally formed with the associated multiplicity of connector portions.

* * * * *